W. J. FRANCKE.
FLEXIBLE COUPLING.
APPLICATION FILED MAY 20, 1915.
1,155,227.
Patented Sept. 28, 1915.
2 SHEETS—SHEET 2.
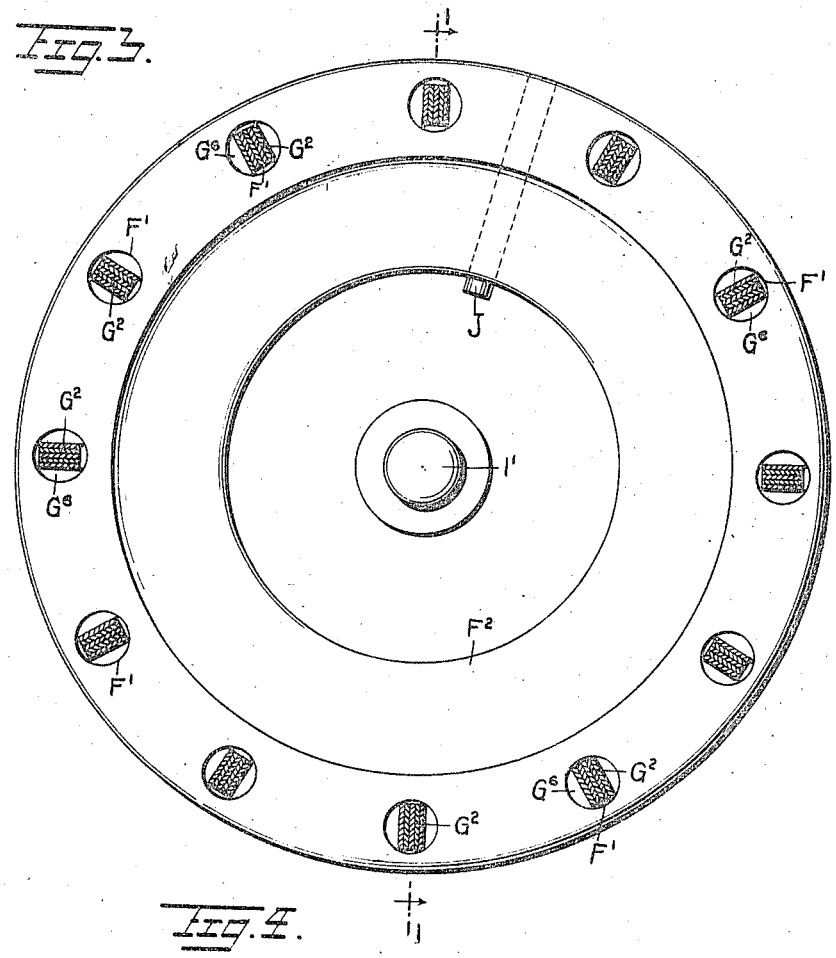
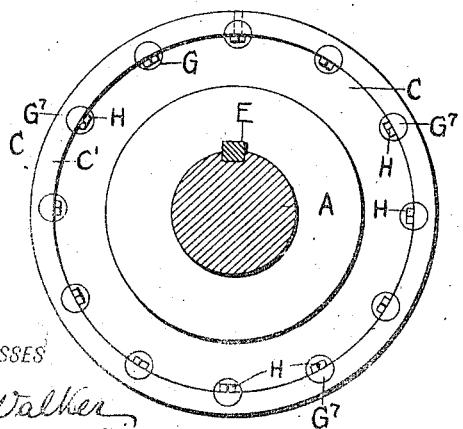
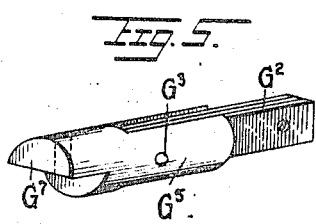
WITNESSES
INVENTOR
William J. Francke
BY
ATTORNEYS

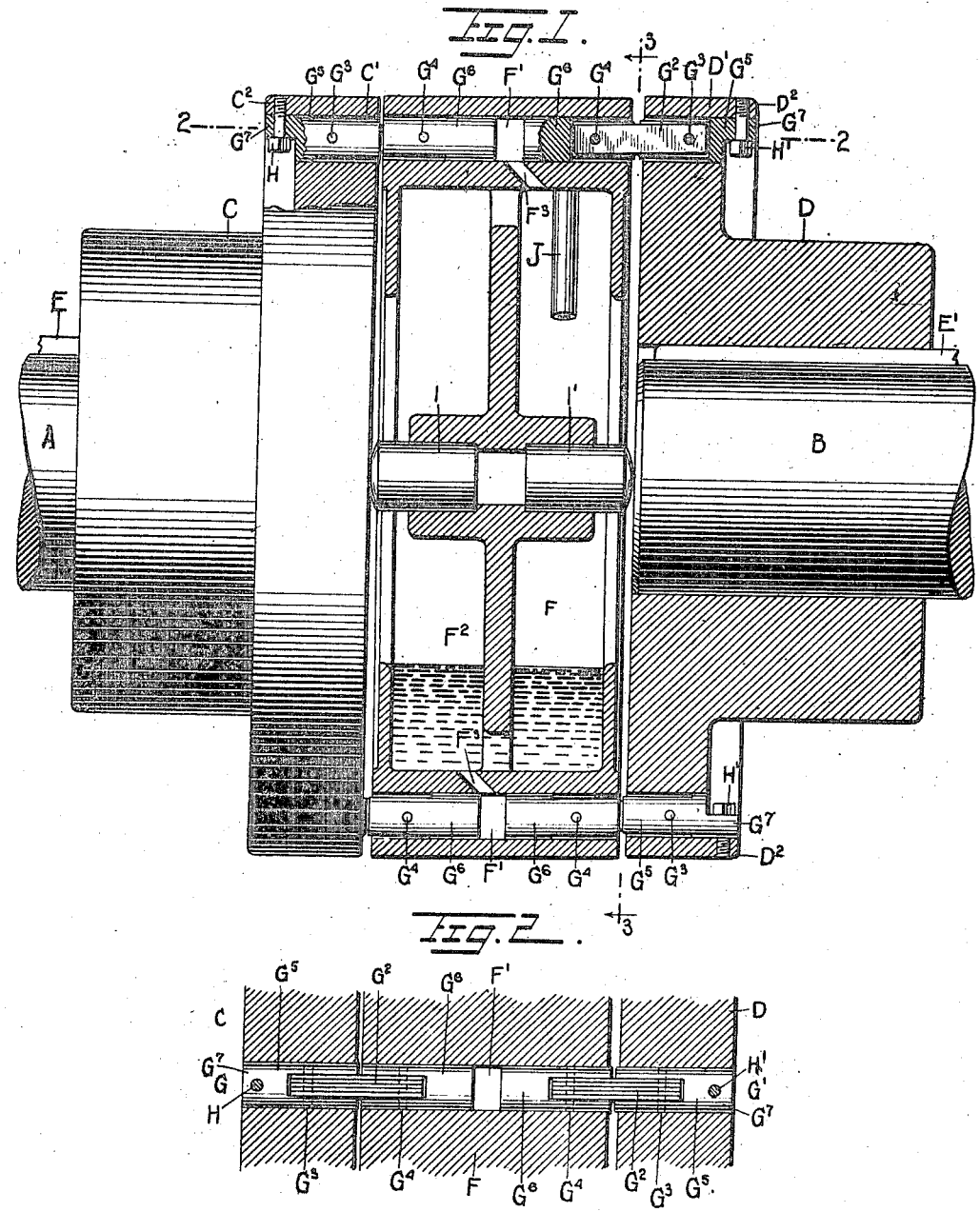

UNITED STATES PATENT OFFICE.

WILLIAM J. FRANCKE, OF HIGHLAND PARK, NEW JERSEY.

FLEXIBLE COUPLING.

1,155,227.                    Specification of Letters Patent.    Patented Sept. 28, 1915.

Application filed May 20, 1915. Serial No. 29,299.

*To all whom it may concern:*

Be it known that I, WILLIAM J. FRANCKE, a citizen of the United States, and a resident of Highland Park, in the county of Middlesex and State of New Jersey, have invented a new and Improved Flexible Coupling, of which the following is a full, clear, and exact description.

The invention relates to flexible couplings such as shown and described in the Letters Patent of the United States, No. 1,029,355 and No. 1,115,299, granted to me on June 11, 1912, and October 27, 1914, respectively.

The object of the present invention is to provide a new and improved flexible coupling, more especially designed for use on the shafts of powerful machinery, and arranged to insure proper transmission of the power from one shaft to the other even should such coupled shafts be parallel or out of center.

In order to produce the desired result, use is made of coupling members adapted to be secured to the adjacent ends of two shafts, a floating member intermediate the coupling members, and flexible connecting members connecting the said coupling members with the said intermediate floating member.

A practical embodiment of the invention is represented in the accompanying drawings forming a part of this specification, in which similar characters of reference indicate corresponding parts in all the views.

Figure 1 is a longitudinal central section of the flexible coupling on the line 1—1 of Fig. 3, and with a portion of one coupling member and the shaft shown in elevation; Fig. 2 is a sectional plan view of the same on the line 2—2 of Fig. 1; Fig. 3 is a transverse section of the same on the line 3—3 of Fig. 1; Fig. 4 is a reduced view of the outer face of one of the coupling members with the shaft shown in section; and Fig. 5 is a perspective view of one of the flexible connecting members.

On the adjacent ends of the shafts A and B to be coupled together are secured the coupling members C and D by the use of keys or similar fastening means E, E′, as plainly shown in Figs. 1 and 4. The coupling members C and D are spaced apart and a floating member F, preferably in the form of a wheel, is arranged intermediate the coupling members C and D and the latter are flexibly connected with the said floating member F by the use of flexible connecting members G, G′ arranged in a circle, the center of which coincides with the axes of the coupling members C and D and the floating member F.

Each of the connecting members G are alike in construction and each is formed of a plurality of superimposed flat steel springs $G^2$ fastened near their ends by pins $G^3$ and $G^4$ to cylindrical keepers $G^5$, $G^6$, of which the outermost keepers $G^5$ are mounted in apertures C′, D′ formed in the corresponding coupling members C and D. The innermost keepers $G^6$ of the connecting members G and G′ slidably engage bearings F′ formed longitudinally in the rim of the intermediate floating member F. Each outermost keeper $G^5$ is provided with a flange $G^7$ fastened by a bolt H or H′ to an overhanging portion $C^2$ or $D^2$ of the corresponding coupling member C or D so that the outer ends of the connecting members G and G′ are rigidly attached to the coupling members C and D while the inner ends of the said connecting members G and G′ slidably engage the intermediate floating member F. The flat springs $G^2$ are arranged so as to flex in the direction in which the coupling members C and D are rotating the same, as more fully described in the patents above referred to, so that further description of the same is not deemed necessary, it being sufficient to state that the rotary motion of one coupling member is transmitted by the set of flexible connecting members G or G′ with the intermediate floating member F, and the latter in turn transmits its motion to the other coupling member by the set of flexible connecting members G′ or G connecting the said floating member F with the coupling member to be driven. It will be noticed that on a strain the inner ends of the flexible connecting members G, G′ are free to slide in the floating member F, and a proper transmission of the power takes place even should the shafts A and B be out of center and disposed parallel one to the other, as indicated in Fig. 1. It will also be noticed that when this condition exists the floating member F is disposed at an angle to the faces of the coupling members C and D.

In order to prevent the floating member F from contacting at its rim with the rims of the coupling members C and D, use is made of pins I and I′ secured to the hub of the floating member F and abutting with their outer ends against the adjacent ends of the shafts A and B. By the arrangement described, the floating member F is not liable to contact with the coupling members C and D to prevent undue friction and to insure the transmission of power from one coupling member to the other solely by means of the flexible connecting members and the floating member F. The floating member F is constructed to form a well $F^2$ for containing a lubricant supplied through a suitable pipe J extending from the inside of the well $F^2$ to the peripheral face of the floating member F. The well $F^2$ is connected by ports $F^3$ with the bearings F' so as to lubricate the keepers $G^6$ sliding in the bearings F'.

Having thus described my invention, I claim as new and desire to secure by Letters Patent:

1. In a flexible coupling, the combination of coupling members adapted to be secured to the adjacent ends of two shafts, an interminate member arranged intermediate the said coupling members, and flexible connecting members connecting the said coupling members with the said intermediate member independently one of the other, each flexible connecting member consisting of a bunch of superimposed flat springs extending approximately parallel to the axes of the coupling members.

2. In a flexible coupling, the combination of coupling members adapted to be secured to the adjacent ends of two shafts, an intermediate member arranged intermediate the said coupling members, and flexible connecting members fixed to the coupling members and having a longitudinal sliding connection with the said intermediate member.

3. In a flexible coupling, the combination of coupling members adapted to be secured to the adjacent ends of two shafts, an intermediate member arranged intermediate the said coupling members, flexible connecting members each having a plurality of superimposed flat springs, and keepers attached to the ends of the springs, the outermost keeper of a flexible connecting member being attached to the corresponding coupling member and the inner keeper of each flexible connecting member slidably engaging the said intermediate member.

4. In a flexible coupling, the combination of coupling members adapted to be secured to the adjacent ends of two shafts, an intermediate member arranged intermediate the said coupling members and having a central contact with the adjacent ends of the said shafts, and flexible connecting members connecting the said coupling members with the said intermediate member.

5. In a flexible coupling, the combination of coupling members adapted to be secured to the adjacent ends of two shafts, an intermediate member arranged intermediate the said coupling members and provided with an oil well and with a series of longitudinal bearings in communication with the said oil well, and flexible connecting members attached at their outer ends to the said coupling members and having their inner ends slidable in the said bearings.

6. In a flexible coupling, the combination of coupling members adapted to be secured to the adjacent ends of two shafts, an intermediate member arranged intermediate the said coupling members and provided with contact abutment pins adapted to engage the adjacent ends of the said shafts, and flexible connecting members connecting the said coupling members with the said intermediate member.

7. In a flexible coupling, the combination of coupling members adapted to be secured to the adjacent ends of two shafts, each coupling member being provided with a series of apertures and having at its outer face an overhanging rim, an intermediate floating member arranged between the said coupling members provided with longitudinal bearings in register with the said apertures, flexible connecting members connecting the said coupling members with the said intermediate member, each flexible connecting member having a plurality of superimposed flat springs and keepers attached to the ends of the said springs, the innermost keeper of a flexible connecting member slidably engaging a bearing in the said intermediate member and the outermost keeper of a flexible connecting member fitting into one of the apertures of a coupling member and having a flange at its outer end, and a bolt fastening the flange of one outermost keeper to the overhanging rim of the corresponding coupling member.

In testimony whereof I have signed my name to this specification in the presence of two subscribing witnesses.

WILLIAM J. FRANCKE.

THEO. G. HOSTER,
GEORGE H. EMSLIE.

Copies of this patent may be obtained for five cents each, by addressing the "Commissioner of Patents, Washington, D. C."